United States Patent
Pattison et al.

(10) Patent No.: US 8,886,748 B1
(45) Date of Patent: Nov. 11, 2014

(54) CONTENT CAPTURE SYSTEM AND METHOD

(75) Inventors: Ian McLean Pattison, Edinburgh (GB); Matt Dunnett, Windsor (GB); Roland Zink, Neu-Anspach (DE)

(73) Assignee: Flash Networks Ltd., Herzliya (IL)

(*) Notice: Subject to any disclaimer, the term of this patent is extended or adjusted under 35 U.S.C. 154(b) by 683 days.

(21) Appl. No.: 13/037,961

(22) Filed: Mar. 1, 2011

(51) Int. Cl.
*G06F 15/16* (2006.01)

(52) U.S. Cl.
USPC .......................................... 709/217

(58) Field of Classification Search
CPC .................................... H04L 12/185
USPC .......................................... 709/217
See application file for complete search history.

(56) References Cited

U.S. PATENT DOCUMENTS

| | | | |
|---|---|---|---|
| 6,240,444 B1* | 5/2001 | Fin et al. ........................ | 709/205 |
| 6,289,382 B1* | 9/2001 | Bowman-Amuah ........... | 709/226 |
| 6,434,568 B1* | 8/2002 | Bowman-Amuah ................... | 1/1 |
| 6,675,216 B1* | 1/2004 | Quatrano et al. ............. | 709/229 |
| 8,238,693 B2* | 8/2012 | Nurminen et al. ............ | 382/286 |
| 8,392,957 B2* | 3/2013 | Holt et al. ..................... | 725/105 |
| 2007/0079383 A1* | 4/2007 | Gopalakrishnan .............. | 726/26 |
| 2008/0083003 A1* | 4/2008 | Biniak et al. .................. | 725/110 |
| 2008/0214148 A1* | 9/2008 | Ramer et al. ............... | 455/414.1 |
| 2009/0003797 A1* | 1/2009 | Nash .............................. | 386/95 |
| 2009/0049004 A1* | 2/2009 | Nurminen et al. ................ | 707/1 |
| 2009/0100003 A1* | 4/2009 | Lahtinen .......................... | 707/2 |
| 2010/0026816 A1* | 2/2010 | Bergstrom et al. ...... | 348/207.11 |
| 2010/0042684 A1* | 2/2010 | Broms et al. .................. | 709/204 |
| 2010/0057843 A1* | 3/2010 | Landsman et al. ............ | 709/203 |
| 2010/0094878 A1* | 4/2010 | Soroca et al. ................. | 707/748 |
| 2010/0153848 A1* | 6/2010 | Saha ............................. | 715/721 |
| 2010/0161754 A1* | 6/2010 | Davis ............................ | 709/217 |
| 2010/0277611 A1* | 11/2010 | Holt et al. .................. | 348/231.2 |
| 2011/0299124 A1* | 12/2011 | Klein ........................... | 358/1.15 |
| 2012/0150993 A1* | 6/2012 | Flack et al. ................... | 709/217 |

* cited by examiner

*Primary Examiner* — Rupal Dharia
*Assistant Examiner* — Marcus McKenzie
(74) *Attorney, Agent, or Firm* — D. Kligler I.P. Services Ltd.

(57) ABSTRACT

Embodiments of the content capture system can receive the request and forward the request to the content provider such that the content provider is unaware that the content capture system is sending the request. When the content provider returns the content to the content capture system, the content capture system modifies the content to include an action trigger, then forwards the modified content to the user. When the user triggers the action trigger, the content capture system captures the content and prepares a message that includes the content. The message is then sent to the destination in a format that is viewable on the target device.

17 Claims, 4 Drawing Sheets

CONTENT CAPTURE SYSTEM AND METHOD

TECHNICAL FIELD

The present invention is generally related to the field of telecommunications, and more particularly, to systems and methods for capturing web based content viewed on a mobile communication device.

BACKGROUND

Mobile communications devices now provide users with the ability to share files with other mobile communication users as well as desktop and laptop users. For example, a user wanting to share a picture with friends may send an email to those friends and attach the picture file to the email. The friends are able to read the email and to open the attached file.

As mobile communication devices advance, users are also able to search and view Internet content. However, the ability for a mobile communication device to share viewed Internet content is limited by the format, the type of content, and the website.

One approach to sharing content is provided by the website. In this method, a user who wants a friend to see the content may request the website to send the content to the friend. The method is commonly implemented by having a button that, when selected ("clicked on") by the user, responds with a box that allows the user to input an email address for the friend. The website then communicates directly with the friend. The communication sent by the website may include a link to the content a text-only version, or some other information. However, the communication may or may not be exactly what the user wanted the recipient to see. Furthermore, the communication to the friend is provided by the website, such that the user can share information only from websites that provide the service, and each website may require the user to input information, including for example, the user's name and contact information and their friend's name and contact information. Unless the website provides this service, the user might not be able to share the content with others.

A second approach to a user sharing content with a recipient generally involves the user sending a link to the content. This approach may be disadvantageous due to the fact that only a link, and not the content, is actually shared with the recipient. As a result, the actual content may not be accessible by the recipient if the content is expired or moved. Furthermore, the recipient needs to be online to access the content. As the recipient receives a link to the content instead of the actual content, the recipient needs to have access to the Internet at the time the recipient wishes to see the content. Another drawback of this system is that the website may require the user to subscribe to the website before allowing them to view the content.

SUMMARY

Embodiments of a content capturing system enable a user to capture content being viewed. The captured content may be provided to the user requesting the content and/or embedded in a message for forwarding or distribution.

As embodiments of the system capture the content on demand of the user, the system can be used to capture any content without requiring support from the content provider. Capturing the actual content at the time of the request enables the recipient of the content to view the content on demand without the risk that the content will become inaccessible, such as through expiration or moving of the content.

Embedding the content in the message enables a user at a mobile communication device to view the content without requiring the recipient to access the Internet or communicate with the content provider after receiving the message.

In one broad respect, embodiments of the present invention are directed to a method for capturing content. The method may comprise receiving, by a content proxy computer, a request from a device for content from a content provider; forwarding the request to a content provider; receiving, by the content proxy computer, content from the content provider; modifying, by the content proxy computer, the content to include an action trigger; forwarding, by the content proxy computer, the modified content to the client device; receiving, at the content proxy computer, a request associated with the action trigger indicating that that the content is to be captured; preparing, at the content proxy computer, a message containing the content in a format suitable for viewing by a target device; and sending the message to the target device. The message comprises the content. In another respect, the method further comprises caching a copy of at least a portion of the content, where the message comprising the content comprises a copy of the original content. In another respect, the method further comprises sending multiple requests for content to one or more content providers. In another respect, the method further comprises caching all original content, wherein multiple pieces of content are assembled before caching the original content. In other respects, the method the action trigger comprises a menu of one or more items, a hot key, or a button. The step of receiving an indication from the client device that content is to be captured comprises one or more of receiving an indication that a menu item was selected, receiving an indication that the hot key was selected and receiving an indication that the button was selected. In another respect, the method further comprises determining one or more properties of the client device, wherein the format is determined based on the one or more properties. In one respect, the step of determining one or more properties of the client device comprises receiving an International Mobile Equipment Identity (IMEI) from the device. In another respect, the step of determining one or more properties of the client device comprises using the User-Agent string in the capture request. The step of determining one or more properties of the client device comprises accessing the Wireless Universal Resource File (WURFL) to locate the information.

In another broad respect, embodiments of the present invention are directed to a system for capturing content. In some embodiments, a system for capturing content comprises a content proxy computer located in a mobile network between a device and a content provider. In one respect, the content proxy computer comprises a processor and a non-transitory computer readable medium comprising instructions. The instructions are readable for receiving a request from a device for content from a content provider; forwarding the request to a content provider; receiving content from the content provider; modifying the content to include an action trigger; forwarding the modified content to the client device, receiving a request associated with the action trigger indicating that that the content is to be captured; preparing a message containing the content in a format suitable for viewing by a target device; and sending the message to the target device, wherein the message comprises the content. In some embodiments, the instructions are further for saving, a copy of the content, where the message comprising the content comprises a copy of the original content. In some embodiments, the instructions are further for sending multiple requests for content to one or more content providers. In some embodiments, the instructions are further for caching all original content, wherein multiple pieces of content are assembled before caching the original content. In some embodiments, the action trigger comprises one or more of a menu of one or more items, a hot key, and a button, wherein the step of receiving an indication from the client device that content is to be captured comprises one or more of receiving an indication that a menu item was selected, receiving an indication that the hot key was selected and receiving an indication that the button was selected. In some embodiments, the instructions are further for determining one or more properties of the client device, wherein the format is determined based on the one or more properties. In some embodiments, the step of determining one or more properties of the client device comprises receiving an International Mobile Equipment Identity (IMIE) from the device. In some embodiments, the step of determining one or more properties of the client device comprises using the User-Agent string in the capture request. In some embodiments, the step of determining one or more properties of the client device comprises accessing the Wireless Universal Resource File (WURFL) to locate the information.

In another broad respect, embodiments of the present invention may be directed to a non-transitory computer readable medium comprising instructions for receiving, by a content proxy computer, a request from a device for content from a content provider; forwarding the request to a content provider; receiving, by the content proxy computer, content from the content provider; modifying, by the content proxy computer, the content to include an action trigger; forwarding, by the content proxy computer, the modified content to the client device; receiving, at the content proxy computer, a request associated with the action trigger indicating that that the content is to be captured; preparing, at the content proxy computer, a message containing the content in a format suitable for viewing by a target device; and sending the message to the target device, wherein the message comprises the content. In some embodiments, the instructions are further for saving, a copy of the content, where the message comprising the content comprises a copy of the original content. In some embodiments, the instructions are further for sending multiple requests for content to one or more content providers. In some embodiments, the instructions are further for caching all original content, wherein multiple pieces of content are assembled before caching the original content. In some embodiments, the action trigger comprises one or more of a menu of one or more items, a hot key, and a button, wherein the step of receiving an indication from the client device that content is to be captured comprises one or more of receiving an indication that a menu item was selected, receiving an indication that the hot key was selected and receiving an indication that the button was selected. In some embodiments, the instructions are further for determining one or more properties of the client device, wherein the format is determined based on the one or more properties. In some embodiments, determining one or more properties of the client device comprises receiving an International Mobile Equipment Identity (IMIE) from the device. In some embodiments, determining one or more properties of the client device comprises using the User-Agent string in the capture request. In some embodiments, determining one or more properties of the client device comprises accessing the Wireless Universal Resource File (WURFL) to locate the information.

Embodiments allow content to be captured and forwarded using different formats, including email, MMS and IMS-based multi-media message formats.

An advantage to capturing the information may be the ability to share content with friends relatively easily. A mobile network operator (MNO) may offer a share service. A user who is viewing information on a mobile device, such as a mobile phone, PDA or laptop connected via a wireless datacard can share content with other users of other mobile devices. The user selects the content to be shared with other users, the system captures the content and includes the content in a message. The message can be sent automatically to the user's own device based on a MSISDN, an email address or the like, or sent to another device based on a MSISDN, an email address or the like.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
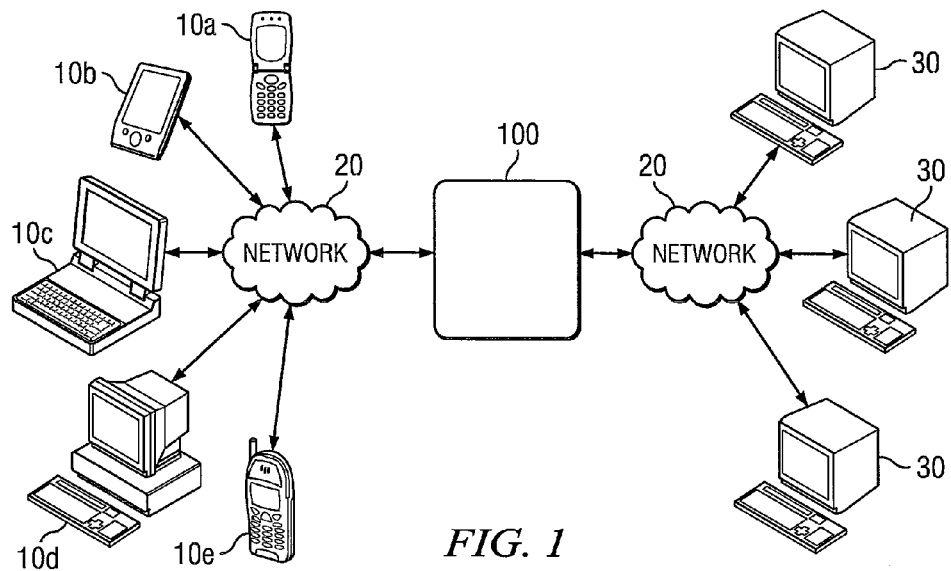
FIG. 1 depicts one embodiment of a network environment.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

Before discussing specific embodiments, embodiments of a hardware architecture for implementing certain embodiments are described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer instructions executable (in other which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.", "in one embodiment."

The invention and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Reference is now made to FIG. 1, which depicts a block diagram of an exemplary environment for capturing content. Devices 10, such as mobile phones 10a and 10e, PDA 10b, laptop 10c, and computer 10d may be connected wirelessly to network 20 such as a LAN, a WAN, a mobile data network such as a GSM or LTE network, the Internet, etc. Mobile phone 10a may have different capabilities than mobile phone 10e. Likewise, mobile phones 10a and 10e may have different capabilities than PDA 10b, laptop 10c, and computer 10d. Devices 10 may send a request for content via network 20 to content providers 30.

In some embodiments, content capture system 100 may be located at a gateway inside a network. In other embodiments, content capture system 100 may be deployed to some other location within the network. In other embodiments, code may be distributed among client devices 10 to distribute content capture system 100 among mobile devices 10. Content capture system 100 may receive the request and forward the request to content providers 30 on behalf of devices 10.

Content providers 30 may return the requested content to system 100. Content capture system 100 may return the content to devices 10 along with an action trigger that enables a user to select content to be captured. Such an action trigger may include, for example, a button or link that a user is allowed to select. This action trigger may be incorporated into the content that is returned to the user. If the user wants to capture the content, the user triggers the action trigger to notify system 100 and system 100 captures the content. The content may be captured and converted into a format suitable for viewing on user's own device 10 or may be captured and converted into a format suitable for sending to another device 10. System 100 may send the captured content to the user device 10, may forward the captured content to a second device 10, or may distribute the content to two or more devices 10.

Figure 2:
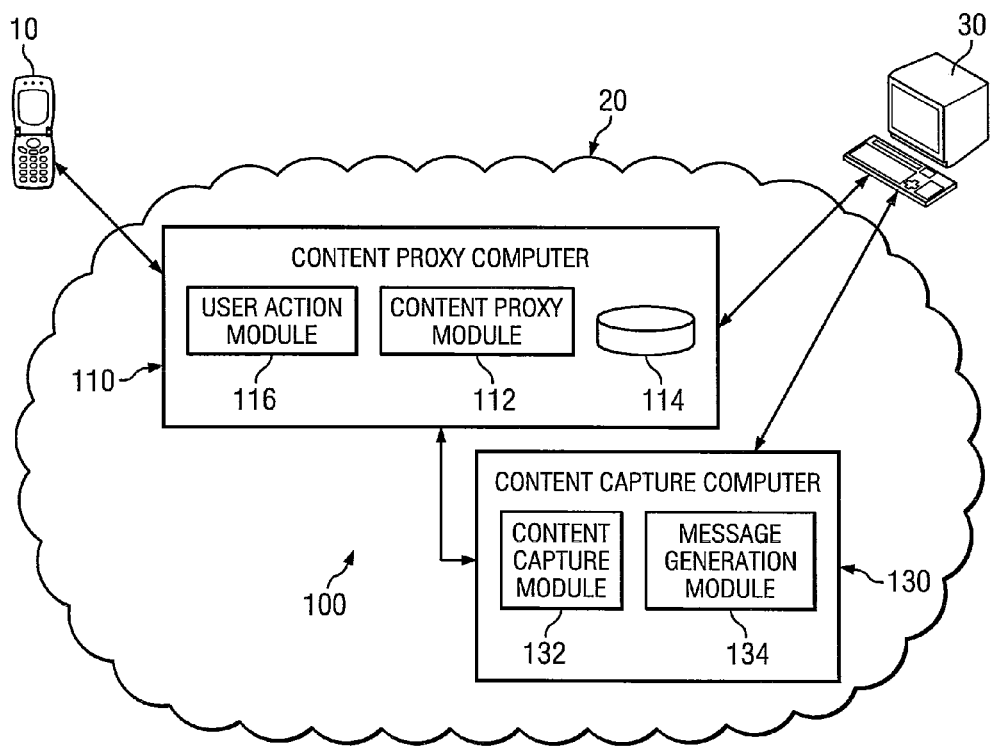
FIG. 2 depicts one embodiment of a system for capturing content.

FIG. 2 depicts a system for capturing content in accordance with one embodiment of the present invention. Content capture system 100 is configured to receive requests for content from mobile devices 10 and to forward requests for content to content providers 30 such that the request appears to content providers 30 as if mobile devices 10 sent the request. Content capture system 100 is further configured to receive content from content providers 30 and forward the content back to the mobile devices 10 for display along with an action trigger that allows the user of mobile device 10 to request content capture. Content capture system 100 is also configured such that, when a user triggers an action trigger to capture content, content capture system 100 can capture the content viewed by the user for sending to the user's mobile device 10 or another device 10.

In one embodiment, content capture system 100 comprises user content proxy computer 110 and content capture computer 130 (that may, in one embodiment, be a single computer). In an embodiment, content proxy computer 110 includes content proxy module 112, user action module 116 and content proxy data store 114. In other embodiments, content proxy data store 114 may be located between content proxy computer 110 and content capture computer 130 or at content capture computer 130. Content proxy module 112 may be configured to receive requests for content sent from devices 10 such that when a user at device 10 requests content from content provider 30, the request is processed by content proxy module 112, a request associated with the originally received request is sent to the content provider 30 and content responsive to that request received at the content proxy module 112 and returned to the device 10 such that it appears to the user device 10 that the request was sent directly to content provider 30. Content proxy module 112 may be operable to function as an explicit proxy, such as a Wireless Application Protocol (WAP) gateway, and/or operable to function as a transparent proxy such that all user requests are processed by content proxy module 112 without requiring a user to configure device 10 to use a proxy. Content proxy module 112 may retrieve content, as discussed below, from content providers 30 such that client device 10 can capture content irrespective of content provider 30.

Content proxy module 112 may store information, including content received from content provider 30 in response to a request in the content proxy data store 114. Thus, the content proxy data store 114 may serve as a cache which stores content received from content provider 30 and associated information. Thus, data that is stored in the content proxy data store may include text, images, headers, page data, style sheets, the original request that resulted in content, the parameters that resulted in stored content, etc. Specifically, in one embodiment, content returned from content provider 30 may be stored in association with an identifier, that may be, for example, a user identifier, one or more parameters of a request, the actual request that resulted in the content or some other type of identifier that allows the content to be located within in the content proxy data store 114.

As content returned from content provider 30 may include multiple portions (e.g. an HTML template, an embedded image, video, text, etc.) that may be requested subsequently to, or substantially simultaneously with, the initial request, the content returned from content provider 30 in response to an initial request may comprise multiple items in content proxy data store 114, where each of these files may comprise a portion of the content and may associated with one another or the content through the identifier(s) associated with each of those files. Specifically, in one embodiment, content proxy module 112 may analyze the initial request and content returned from content provider 30 to ensure that any content associated with initial request is stored in content proxy data store 114.

Thus, when device 10 requests content from content provider 30, the content may be returned to content proxy computer 110 and stored in content proxy data store 114. The content proxy can thus serve as a cache such that a subsequent content capture request can identify the content in cache and hence ensure that substantially exactly the same content is captured as displayed. Accordingly, content may be stored in the content proxy data store 114 on a per user per session basis. The content proxy data store 114 may be specialized for content capture. For example, in some embodiments the content proxy data store 114 may be configured to ignore headers indicating that content is not cacheable such that captured content can be subsequently retrieved from cache if requested to be captured. User content proxy computer 110 may also include user action module 116. User action module 116 may be configured to enable a user at client device 10 to send a request to system 100 to capture content previously provided by content provider 30. In some embodiments, user action module 116 may modify content to be returned to the device 10 in response to a request to provide the ability for the user to capture at least a portion of that content. More specifically, user action module 116 may provide an action trigger to device 10 in association with the content. In one embodiment, such an action trigger may be implemented as a link in either a header or a footer of the content. Thus, in some embodiments, a header or footer including such a link may be added to the content itself by user action module 116 by modifying the content received from content provider 30. In some embodiments, an action trigger can be provided as a link provided in a toolbar and the toolbar is added to the page as a header, footer or floating over the page. The link may be presented in various forms, including text and/or images included in the content. The modified content (the content and the associated action trigger) may then be returned to the user's device which issued the original request for the content.

Other types of action triggers may be provided by extending a browser menu to include one or more menu items by which a user can send a request to system 100 to capture content. For example, one menu item may allow a user to send a request to content capture system 100 to capture the content and send to his/her own client device 10, a second menu item may allow a user to send the captured content to a different client device 10, and a third menu item may allow a user to distribute captured content to several client devices 10. In some embodiments, an action trigger may be provided as a function key or hot key. Those skilled in the art will appreciate that the technique used to provide an action trigger may depend on MNO preference(s), user preference(s) (e.g. stored at the content capture system 100), device capabilities, or other information.

Furthermore, in certain embodiments, multiple action triggers may be associated with the content where each of the action triggers may be associated with different functionality or different portions of the presented content. For example, one action trigger may associated with capturing content in a particular format, having content delivered in a particular format or via a particular channel, capturing only a portion of the content displayed, where the captured content is to be delivered (e.g. to user's device or account, or another device or account), etc.

Accordingly, when requested content is returned to the user at the device 10 the user may be presented with an action trigger whereby selecting the action trigger at least a portion of the content presented to the user may be captured.

More specifically, when the action trigger is selected by the user, a request for content capture may be received by content capture module 132 at content capture computer 130. In one embodiment, the selection of the action trigger may cause a request comprising one or more identifiers (e.g. parameters, URLs, etc.) to be issued from the device 10 to content capture module 132. These identifiers may, for example, allow the identification of the content, or portion of the content, to be captured, the user who desires the content to be captured, the format in which the captured content is to be delivered, the destination for the captured content, etc. For example, the action triggers may be associated with a link whereby selecting the action trigger causes the link to be activated and the request to the content capture module 132 to be issued.

When content capture module 132 receives a request associated with an action trigger, content capture module 132 responds by capturing the content associated with received request. In some embodiments, to capture the content, content capture module 132 retrieves content from content proxy data store 114 based on an identifier in the received content capture request. As the content stored in content proxy data store 114 may be what was received from content provider 30 in response to the initial user request it can be ensured that the content captured may be exactly what was provided to the user in response to this initial request.

In some embodiment, content may not be stored in content proxy data store 114. In this case, content to be captured may be requested from the content provider 30. More specifically, based on the received request associated with the action trigger, the content capture module 132 may issue a request for the content to content provider 30 and receive the content to be captured from content provider 30. As noted above, as content returned from content provider 30 in response to a request may include multiple portions (e.g. an HTML template, an embedded image, video, text, etc.), content capture module 132 may analyze the content returned from content provider 30 in response to the request to ensure that any content associated with the initial request from content capture module 132 is obtained regardless of whether it is subsequently requested from, or provided by, content provider 30 in association with content provided in response to the initial request content capture module 132.

Once the content to be captured is retrieved (e.g. from content proxy data store 114 or from content provider 30) by content capture module 132, message generation module 134 may form this content as a message in an appropriate delivery format and deliver this message to an appropriate destination. As noted above, the action trigger selected by the user may be associated with a particular portion of content to be captured, a format for delivery, a destination for the delivery of the captured content, etc. Specifically, in one embodiment, the request received by content capture module 132 when the action trigger is selected by the user may comprise identifiers associated with the format or delivery destination. Based on these identifiers the captured content can be formed into a message by message generation module 134 and delivered to the appropriate destination through the appropriate channel. For example, if the message is to be delivered via MMS, message generation module 134 may translate the captured content into an image supported by MMS. If the delivery channel is email, message generation module 134 may translate the captured content into a multipart HTML email message containing the captured content. Other formats and channels, etc. are of course, possible and will be understood to be contemplated herein.

Figure 3A:
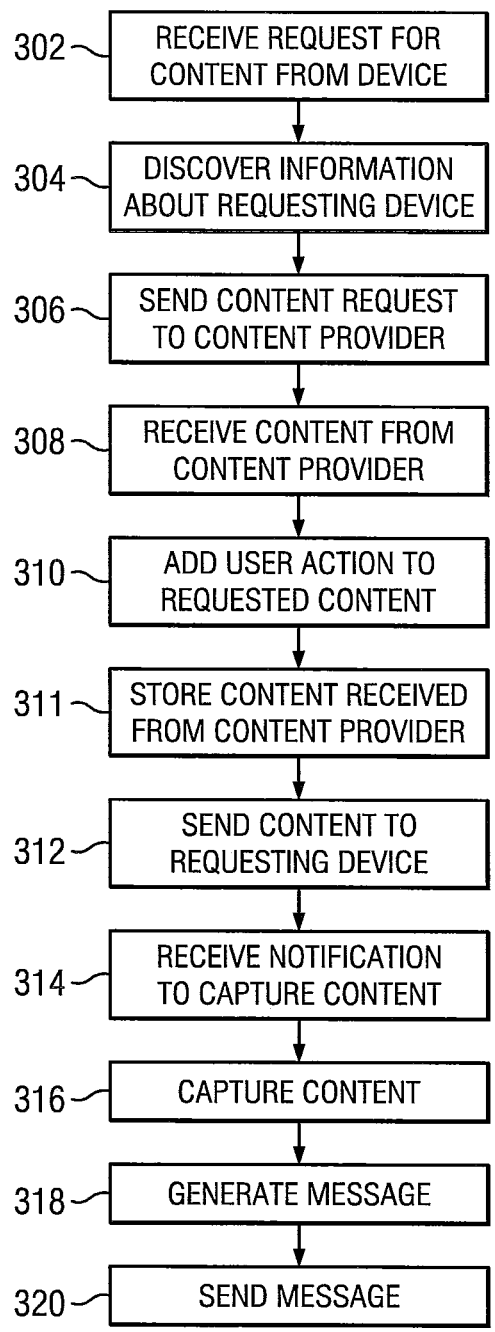
FIG. 3A depicts a flow diagram of one embodiment of a system for capturing content.
Figure 3B:
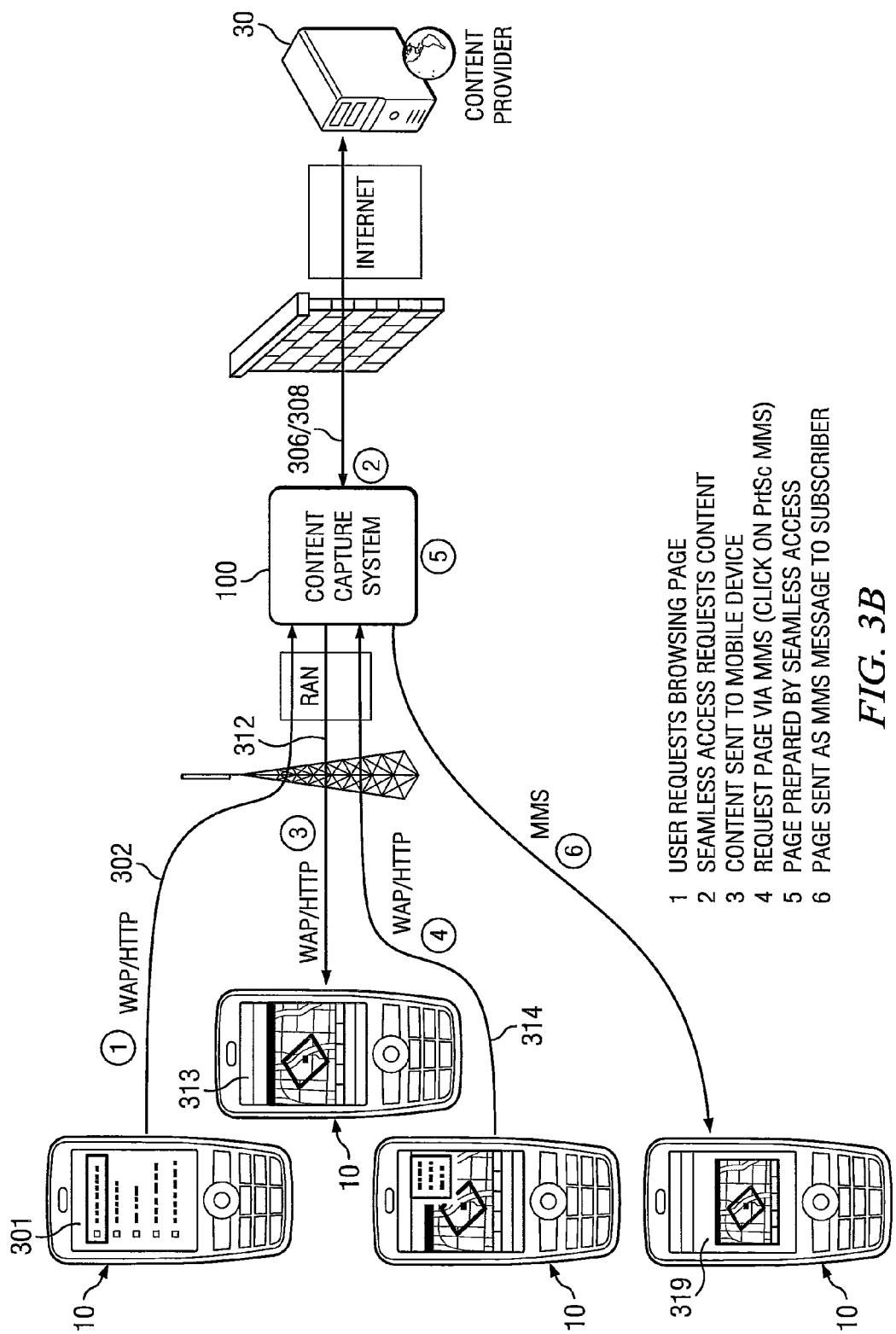
FIG. 3B depicts a flow diagram of a method for capturing content and further depicts user devices having exemplary screen shots at various stages during the flow diagram.
Figure 3C:
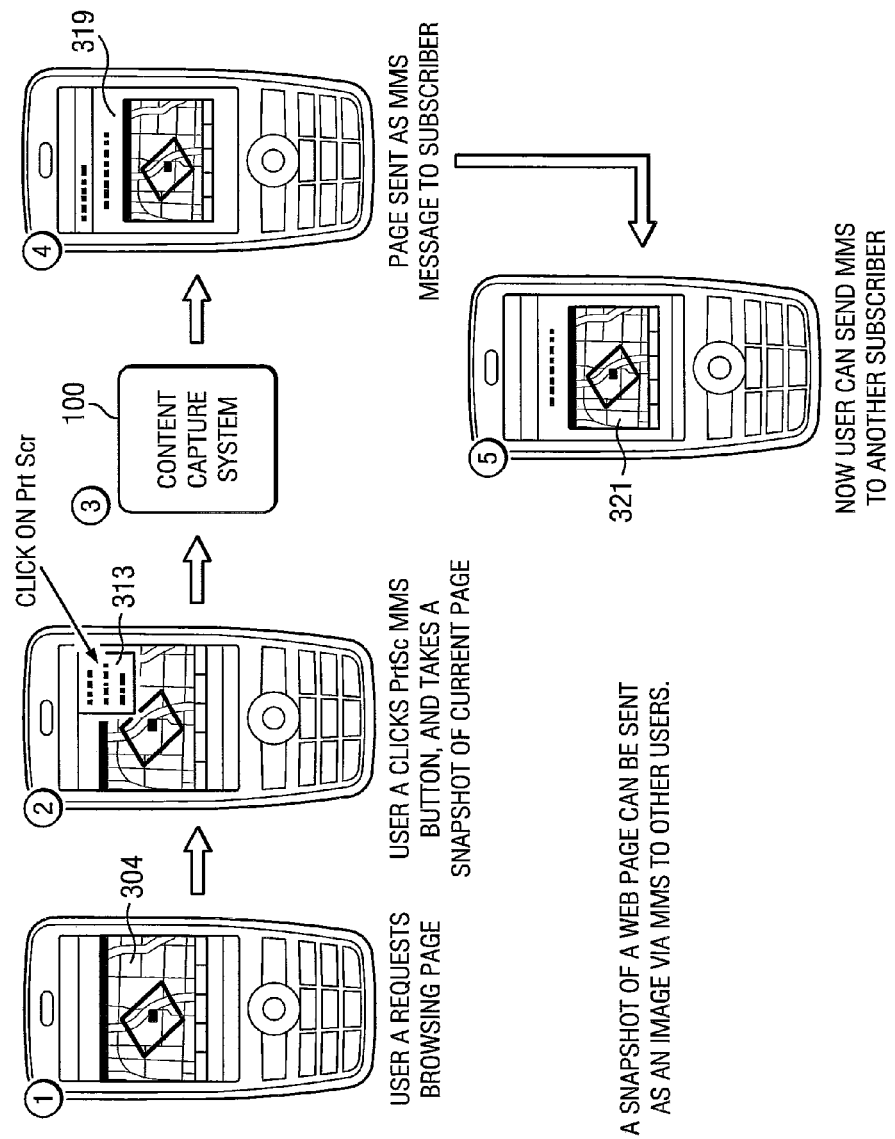
FIG. 3C depicts a flow diagram and further depicts user devices having exemplary screen shots at various stages during the flow diagram.

In operation, then, system 100 may support the capturing of content. FIG. 3A depicts a flow diagram illustrating one such method 300 for capturing content presented to users of mobile devices 10 and the delivery of such captured content. It will be noted that the steps presented in FIG. 3A may be performed in a different order than depicted and that steps may be omitted or other steps added. FIG. 3B depicts a flow diagram of a method for capturing content, including user devices 10 having exemplary screen shots at various stages in a content capturing method. FIG. 3C further depicts user devices 10 having exemplary screen shots at various stages in a content capturing method.

A user at client device 10 sends a request for content intended for content provider 30. FIG. 3B depicts screen shot 301 on a cell phone 10 sending a request for content. The request may be a request for static content or dynamic content. For purposes of this disclosure, static content may refer to content that does not typically change over time. Examples of static content include pictures and articles. For purposes of this disclosure, dynamic content may refer to content items that change over time. Examples of dynamic content include a stock ticker, a developing news story or a sports scoreboard.

In step 302 of FIG. 3A, the request for content is received by content proxy module 112. In various embodiments, content proxy module 112 may perform as an explicit proxy (such as a WAP gateway) or may perform as a transparent proxy in a Mobile Network Operator (MNO) network.

In step 304 of FIG. 3A, content proxy module 112 is able to obtain information about device 10 or the user of the device 10 including determining the capabilities of device 10, what type of browser is supported by device 10, and other information useful for determining how to provide content to a user of device 10.

Obtaining information about the capabilities of device 10 has traditionally been difficult, as WAP devices exhibit significant differences in the way they handle content. For example, some mobile devices 10 are capable of using techniques based on Java script. Other mobile devices 10 cannot use these techniques and may require reformatting the content. Step 304 may involve various techniques for determining the capabilities of device 10. In the case of web-based content, one technique useful for determining the capabilities of device 10 may be based on a user agent string. A user agent string may include information about a browser that the mobile device is capable of accessing, a browser version, a platform, security values, an operating system, a language tag, or some other device information that content proxy module 112 is able to detect. As an example, a user agent string may have the following elements:
User-Agent: Mozilla/5.0 (SymbianOS/9.2; U; Series60/3.1 NokiaN95/21.0.016; Profile/MIDP-2.0 Configuration/CLDC-1.1) AppleWebKit/413 (KHTML, like Gecko) Safari/413.

Based on the elements of a user-agent string, information may be obtained as to whether the device supports Javascript, whether the device supports mime multipart, the maximum size and resolution of images or the like.

In some embodiments, device manufacturers may provide information such as a User Agent Profile (UAProf) for defining capabilities and preference information for wireless device 10. The UAProf file may be provided by the device manufacturer or some other entity, such as the telecommunications company. Another source of information about device capabilities may be Wireless Universal Resource File (WURFL) which is an open-source repository based on a community effort to identify different ways in which WAP content is handled.

In some embodiments, device information may be obtained from Remote Authentication Dial-In User Service (RADIUS) accounting records. Information received from RADIUS accounting records may include information about device capabilities such as the International Mobile Equipment Identifier (IMEI), a unique serial number for each wireless device, as well as a Mobile Subscriber Integrated Services Digital Network Number (MSISDN). The IMEI for a mobile device provides information that identifies the manufacturer and information about that particular device. Using this information, content proxy module 112 may communicate with a device capabilities database to determine the capabilities for device 10. In other embodiments involving IMS client devices in a Session Initiation Protocol (SIP) environment, an OPTIONS method may be sent to device 10 to ask device 10 for the capabilities.

In step 306 and step 308 of FIG. 3A, content capture system 100 communicates via network 20 with content provider 30 to retrieve content requested by client device 10. Advantageously, because information on client device 10 or a user of client device 10 has been obtained by system 100, system 100 may communicate with content provider 30 as if all content was requested directly by device 10. Retrieving content may involve communication through a firewall, as depicted in FIG. 3B. Retrieving content in response to a request may require only one request or may require multiple requests sent to content providers 30. As a result, content capture system 100 may retrieve multiple portions of content from content provider 30. In some embodiments, content capture system 100 may communicate with one or more content providers 30 to retrieve the various portions of content. Because content capture system 100 sits in (i.e., communicates with) the mobile network and comprises information about device 10 requesting the content, content capture system 100 is able to initiate and maintain communication with content providers 30 to request and retrieve multiple pieces of content. The retrieved content may be cached as it is retrieved. A single portion, referred to as a multi-part, or individual portions received in response to multiple requests may be returned. In the latter case, once all pieces of content have been retrieved by content capture system 100, content capture system 100 may store the content in a cache for later retrieval and assembly or reassemble all the pieces into a single piece of content and store the assembled content in a cache.

In step 310, content capture system 100 may modify at least a portion of the content before sending the content to the user. Modifying the content includes adding one or more action triggers to the original content or a copy of the original content. Content proxy module 112 may present an action trigger to enable a user of mobile device 10 to send a request to content capture system 100 to capture content that was provided by content provider 30. The action trigger may be presented to mobile device 10 in several ways. One method involves providing a link, such as a link in either the header or the footer of the content. Another method may involve extending the browser's menu system to include a menu item. Yet another method may include providing a function key or a hot key on the device 10. Thus, the content, as provided to client device 10, is associated with an action trigger to allow the user to send a request to content capture system 100 to capture the content. Adding an action trigger to content may also include adding a toolbar, a menu, or some other functionality, for example to a browser or an application. In one embodiment a floating toolbar can implemented by embedding and referencing appropriate javascript and other elements to the returned page.

The content may be modified to include such action triggers using various techniques and at various points in the delivery process. For example, Mobile Network Operators (MNOs) typically manipulate generic internet content for display on small screen devices 10. In some embodiments, the MNO may be provided with an action trigger for incorporation into the content as the content is being modified for small screen viewing. In other embodiments, modified content may be received from an MNO and further modified to include the action trigger. The action trigger (that may be a button or the like as described above) may be specific to the user and the content requested or specific to the type of action requested, may be specific for capturing the content in particular format, specific for delivery of the captured content through a specific channel, specific for delivery of the content to one or more destinations, etc. For example, a button could designate the content is to be delivered to the user, to a different user, or that the content is to be distributed to a number of users.

In step 311, content capture system 100 may optionally store content received from content provider 30. For example, if a user requests dynamic content from content provider 30, content capture system 100 may need to keep a copy of the content so that, if the user wants to capture this content, content capture system 100 will be able to provide the same content as was originally viewed by the user. Content capture system 100 may keep a copy of all content, may keep a copy of selected types of content, may keep a copy from selected types of content providers, or may keep content based on some other criteria. Content capture system may use heuristics or other methods to determine whether to keep a copy of the content.

One type of content that may be stored in certain embodiments is content that is determined to be dynamic. For example, if content capture system 100 finds <HTTP-EQUIV="PRAGMA" CONTENT="NO-CACHE"> (or a similar) metatag in the header section at the beginning of an HTML Web page received from a content provider 30, content capture system 100 may determine that the content is considered non-cacheable, which may indicate that the content is dynamic. Thus, content capture system 100 may keep a copy of such content. Another type of content that may be stored is personalized content. For example, content capture system 100 may see a tag in content received from content provider 30 that indicates that the content is only applicable for that user. In these cases, it may be desirable for content capture system 100 to keep a copy to prevent the possibility that a subsequent request for the content results in different content. The copy retained by content capture system 100 may be a clean copy—that is, a copy of the content before any modification by content capture system 100 or other systems. In some embodiments, the copy may be stored at content proxy data store 114. The content may have a time/date stamp or otherwise tagged and can be stored in a first-in/first-out (FIFO) format or some other format to ensure the content is retrievable but is not necessarily stored forever.

In step 312 of FIG. 3A, content capture system 100 communicates with device 10 to provide the content requested by the user. As depicted in FIGS. 3B and 3C, the content viewed by the user at client device 10 may comprise the content as provided by content provider 30 and the action triggers 313 included by modifying the content. The included action trigger (e.g. button or other action trigger) may be configured to uniquely identify the content returned by content provider 30. For example, the action trigger may include a link to issue a request that references the content by a URL.

In step 314 of FIG. 3A, content capture system 100 receives a communication from mobile device 10 indicating a user has triggered an action trigger to capture content (e.g. the content being viewed). FIG. 3B depicts cell phone 10 with a screen shot depicting how a user may trigger an action trigger 313. As depicted in FIG. 3B, a user may select from a drop-down menu. In one embodiment, content capture system 100 identifies the device 10 or user requesting the content because content capture system 100 is coupled to the mobile network to which the user subscribes. In some embodiments, the communication from the device 10 is a request comprising a URL identifying content capture system 100, such that when the action is triggered, an HTTP request is sent to content capture system 100. The request may include an instruction to capture content, and the parameters (params) of the URL may identify the content or portion of content that is to be captured. In some embodiments, the URL may identify the content capture computer 130. For example, the request may be an http request with a URL for www.724Solutions.contentcapture.com and a parameter may identify the original URL for capturing as www.google.com. In other embodiments that request may not identify the content requested explicitly, but instead provide another type of identifier by which content capture system 100 may identify the content requested. Such an identifier may, for example, comprise a hash value or other numbered identifier, a string value or another type of identifier.

Accordingly, in one embodiment content capture system 100 is operable to receive the request and capture the desired content using the request, an instruction to capture content, params of a URL, or some other information in the request, or use a type of identifier that allows content capture system 100 to identify the content to be captured, and does not need to have a cache number, a location in the cache, or other reference that is specific to content capture system 100 to be able to retrieve the desired content. As discussed above, an action trigger may be specific to the user and the content requested or specific to the type of action requested, capturing the content in particular format, delivery of the captured content through a specific channel, etc. Thus, the communication received by the content capture system 100 in accordance with the triggering of an action trigger by a user may indicate the format, destination, channel, etc. desired by a user, for example to capture the content for a user's own device 10 or capture the content in a message intended for one or more devices 10. Thus, when any action is triggered by a user of mobile device 10, content capture system 100 can determine device 10 making the request, the URL of the content being requested, or an action that the user wants content capture system 100 to perform.

In step 316, content capture system 100 may obtain content to be captured based on the communication received from mobile device 10. More specifically, a request to capture content may cause content capture system 100 to locate content stored in content proxy data store 114 and/or send a request to content provider 30 for the content. If the content originally provided by content provider 30 is personalized or otherwise contains information specific to a user, retrieving the content from cache 114 may be beneficial by eliminating the need to resend a request to content provider 30. As noted above, content originally provided to a user may be stored in multiple locations within the content proxy data store 114. Thus, obtaining content to be captured may entail locating multiple portions of the content to be captured from in the content proxy data store 114 based on the communication.

Additionally, content capture module 132 may be configured to retrieve the information from the content provider 30 as if the content had been requested by the user. Content capture module 132 may provide device information, a username, a password, cookie information or other information such that content provider 30 is unaware that mobile device 10 is not directly communicating with content providers 30. Here, retrieving the information from the content provider 30 may entail the generation of one or more requests for the content to be captured by content capture module 132 based on the received communication. Thus, the content to be captured may be obtained from the response(s) to these one or more requests from the content provider 30. Some combination of these approaches may also be utilized to obtain content to be captured. For example, some portions of the content to be captured may be located in content proxy data store 114 while others portions may be received from the content provider 30 in response to one or more generated requests.

In step 318 of FIG. 3A and depicted in screen shot 319 of FIGS. 3B and 3C, the captured content may be generated and delivered to device 10. The delivery of the captured content may comprise generating a message to be sent to one or more mobile devices 10. Such messages may, for example, be generated by message generation module 134 that include the captured content in a format to be delivered to a destination through a channel. As discussed above, criteria such as the formation, destination, channel, etc. may be specified in the communication generated when the user triggers an action trigger which is received by the content captured system 100. In certain cases, message generation module 134 may obtain information on the capabilities of devices associated with particular destinations. In certain embodiments, content capture system 100 may have access to information on devices 10 within the MNO that comprises the device 10 at which the content capture communication was generated while information on devices external to the MNO that comprises the device 10 that generated the content capture communication may be obtained from external systems.

In step 320 of FIG. 3A, a message containing the captured content may be sent to one or more users of devices 10. As depicted by screen shot 321 in FIG. 3C, a user of a different device 10 is able to view the same content that was viewed (and captured) by the sender.

Alternatively, the message may be generated according to one or more default criteria. For example, an action trigger may only indicate to a user that content is to be captured. The communication received at content capture computer 130 may thus only indicate the content to be captured. Here, a message may be generated that includes the captured content in a format compatible with the user's mobile device 10, to be delivered to that mobile device (in other words, to the destination of that mobile device over the channel associated with that mobile device). Information on the device 10 utilized to generate such a message may have been obtained as discussed above. Specifically, in certain embodiments, message generation module 134 has access to the WURFL, UAProf, IMEI, and other information associated with the properties of device 10 to ensure that a message is presented in a form suitable for display on device 10. In some embodiments, if the user is capturing content to send to another user, the target device type may be known if the other user subscribes to the same MNO and the MNO has a database of subscribers' device types.

It should be noted that the methodologies disclosed herein may be implemented in various combinations of software (including firmware) and hardware. The present application is therefore intended to cover software applications that include instructions for causing a computer or other data processor to perform the methods disclosed herein. These software applications may be embodied in any medium readable by such a computer or data processor, including floppy disks, CD-ROMs, DVD-ROMs, RAM, ROM, and the like. Likewise, a computer or data processor which is configured to execute such software applications, or which is otherwise programmed to perform the methods disclosed herein is intended to be covered by the present application.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

It should be understood that the inventive concepts disclosed herein are capable of many other modifications. To the extent such modifications fall within the scope of the appended claims and their equivalents, they are intended to be covered by this patent. It should also be understood that the term "a" as used herein generally means "one or more" and is not intended to be construed in a singular sense. In addition, the operations described in connection with the methods of the present invention need not necessarily be executed in the sequence described, as they may be executed in a different sequence consistent with the principles of the present invention.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for handling capturing content transmitted from a content provider to a client device, comprising:
   receiving, by a content proxy computer, original content from the content provider;
   storing the original content in a content proxy data store;
   inserting, by the content proxy computer, into the original content an action trigger, which enables a user to request capture of the original content;
   wherein the action trigger comprises one or more of a menu of one or more items, a hot key and a button, wherein the step of receiving an indication from the client device that the original content is to be captured comprises one or more of receiving an indication that a menu item was selected, receiving an indication that the hot key was selected and receiving an indication that the button was selected;
   forwarding, by the content proxy computer, the original content with the action trigger to the client device;
   receiving, by a content capture module, a request for content capture associated with the action trigger indicating that the original content is to be captured;
   retrieving, by the content capture module, the original content or a portion thereof from content proxy data store of the content capture system;
   preparing, by the content capture system, a message containing a copy of the original content or the portion thereof in a format suitable for viewing by a target device; and
   sending the message for delivery over a network to the target device.

2. The method of claim 1, further comprising:
   caching all original content received from the one or more content providers in the content proxy data store.

3. A system for capturing content, comprising:
   at least one processor;
   a content proxy data store; and
   a non-transitory computer readable medium comprising instructions executable by the at least one processor for:
   receiving original content from the content provider;
   storing the original content in a content proxy data store;
   inserting into the original content, an action trigger which enables a user to request capture of the original content;
   wherein the action trigger comprises one or more of a menu of one or more items, a hot key and a button, wherein the step of receiving an indication from the client device that the original content is to be captured comprises one or more of receiving an indication that a menu item was selected, receiving an indication that the hot key was selected and receiving an indication that the button was selected;
   forwarding the original content with the inserted action trigger to the client device;
   receiving a request for content capture associated with the action trigger indicating that the original content is to be captured;
   retrieving the original content or a portion thereof from the content provider or the content proxy data store;
   preparing a message containing a copy of the original portion thereof in a format suitable for viewing by a target device; and
   sending the message for delivery over a network to the target device.

4. A non-transitory computer readable medium, comprising instructions executable by the at least one processor of a content capture system for:
   receiving, by the content capture system, original content from the content provider;
   inserting, by the content capture system, into the original content, an action trigger which enables a user to request capture of the original content;
   wherein the action trigger comprises one or more of a menu of one or more items, a hot key and a button, wherein the step of receiving an indication from the client device that the original content is to be captured comprises one or more of receiving an indication that a menu item was selected, receiving an indication that the hot key was selected and receiving an indication that the button was selected;
   forwarding, by the content capture system, the original content with the action trigger to the client device;
   receiving, by the content capture system, a request for content capture associated with the action trigger indicating that the original content is to be captured;
   retrieving, by the content capture system, the original content or a portion thereof from the content proxy data store;
   preparing, by the content capture system, a message containing a copy of the original content or the portion thereof in a format suitable for viewing by a target device; and
   sending the message for delivery over a network to the target device.

5. The method of claim 1, wherein inserting the action trigger comprises inserting an action trigger which includes a link, into a header or footer of the forwarded content.

6. The method of claim 1, wherein inserting the action trigger comprises inserting an action trigger which includes a URL link in a toolbar for display floating over the original content.

7. The method of claim 1, wherein inserting the action trigger comprises inserting an action trigger which includes a plurality of menu items which enable a user to request capture of the original content and sending of the captured content to different respective destinations.

8. The method of claim 1, wherein inserting the action trigger comprises inserting one or more action triggers which enable a user to request capture of different portions of the original content.

9. The method of claim 1, wherein inserting the action trigger comprises inserting one or more action triggers which enable a user to request capture of the original content in different formats.

10. The method of claim 1, wherein storing the original content in a content proxy data store comprises storing the original content on a per user and a per session basis.

11. The method of claim 1, wherein receiving a request for content capture comprises receiving a request indicating a plurality of destinations to which the captured content is to be sent.

12. The method of claim 1, wherein receiving a request for content capture comprises receiving a request indicating a destination, other than that of the requester, to which the captured content is to be sent.

13. The method of claim 12, further comprising determining information on the capabilities of the indicated destination and wherein preparing the message is performed responsively to the determined information on the capabilities.

14. The system of claim 3, wherein the instructions cause the processor to insert an action trigger which includes a link, into a header or footer of the forwarded content.

15. The system of claim 3, wherein the instructions cause the processor to insert an action trigger which includes a plurality of menu items which enable a user to request capture of the original content and sending of the captured content to different respective destinations.

16. The system of claim 3, wherein the instructions cause the processor to insert one or more action triggers which enable a user to request capture of different portions of the original content.

17. The system of claim 3, wherein the instructions cause the processor to store the original content on a per user and a per session basis.

\* \* \* \* \*